United States Patent
Moteki et al.

(10) Patent No.: US 11,027,720 B2
(45) Date of Patent: Jun. 8, 2021

(54) HYBRID VEHICLE

(71) Applicant: TOYOTA JIDOSHA KABUSHIKI KAISHA, Toyota (JP)

(72) Inventors: Taro Moteki, Susono (JP); Kenji Itagaki, Sunto-gun (JP); Koichi Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 16/272,062

(22) Filed: Feb. 11, 2019

(65) Prior Publication Data

US 2019/0248362 A1 Aug. 15, 2019

(30) Foreign Application Priority Data

Feb. 13, 2018 (JP) .............................. JP2018-023015

(51) Int. Cl.
*B60W 20/19* (2016.01)
*B60W 10/08* (2006.01)

(52) U.S. Cl.
CPC ............ *B60W 20/19* (2016.01); *B60W 10/08* (2013.01); *B60W 2510/0638* (2013.01); *B60W 2540/10* (2013.01); *B60W 2710/0666* (2013.01); *B60W 2710/083* (2013.01); *B60Y 2200/92* (2013.01)

(58) Field of Classification Search
CPC ................. B60W 20/19; B60W 10/08; B60W 2710/083; B60W 2510/0638; B60W 2710/0666; B60W 2540/10; B60W 20/15; B60W 10/06; B60W 50/082; B60W 10/11; B60W 20/00; B60Y 2200/92; Y02T 10/72; Y02T 10/62; B60K 6/445
USPC .......................................................... 701/22
See application file for complete search history.

(56) References Cited

U.S. PATENT DOCUMENTS

| | | | | |
|---|---|---|---|---|
| 5,928,301 A | * | 7/1999 | Soga ....................... | B60L 50/15 701/51 |
| 6,077,186 A | * | 6/2000 | Kojima ................. | B60W 10/08 477/3 |
| 2003/0109357 A1 | * | 6/2003 | Tabata ................... | B60W 10/11 477/109 |
| 2005/0245349 A1 | * | 11/2005 | Tabata ................... | B60W 30/20 477/3 |

(Continued)

FOREIGN PATENT DOCUMENTS

| | | |
|---|---|---|
| JP | 2006-240608 A | 9/2006 |
| JP | 2011002060 A | 1/2011 |

(Continued)

*Primary Examiner* — Jonathan M Dager
*Assistant Examiner* — Jean W Charleston
(74) *Attorney, Agent, or Firm* — Sughrue Mion, PLLC

(57) ABSTRACT

A hybrid vehicle includes an engine; a motor generator; and an electronic control unit to control the engine and the motor generator. Further, when an engine speed thereof is increased, the electronic control unit calculates an engine torque by adding an engine inertia torque to a request engine torque and cause the engine to output the calculated engine torque, and cause the motor generator to output a reaction torque in response to the request engine torque, and the electronic control unit performs control so that a torque assistance amount exerted by the motor generator is changeable while the engine speed is increased.

3 Claims, 6 Drawing Sheets

(56) References Cited

U.S. PATENT DOCUMENTS

| | | | | |
|---|---|---|---|---|
| 2008/0045382 A1* | 2/2008 | Kawasaki | ............ | B60W 20/00 |
| | | | | 477/115 |
| 2008/0076623 A1 | 3/2008 | Tabata et al. | | |
| 2012/0101678 A1 | 4/2012 | Oyama et al. | | |
| 2013/0304296 A1* | 11/2013 | Ueda | ................ | B60W 10/02 |
| | | | | 701/22 |
| 2013/0325238 A1 | 12/2013 | Kato et al. | | |
| 2015/0039168 A1* | 2/2015 | Kamatani | ............ | F02D 41/062 |
| | | | | 701/22 |
| 2015/0367833 A1* | 12/2015 | Maeda | ................ | B60W 20/10 |
| | | | | 701/22 |
| 2018/0072301 A1* | 3/2018 | Itagaki | ................ | B60K 6/445 |

FOREIGN PATENT DOCUMENTS

| | | |
|---|---|---|
| JP | 2013-252803 A | 12/2013 |
| WO | 2012/114440 A1 | 8/2012 |

\* cited by examiner

HYBRID VEHICLE

CROSS-REFERENCE TO RELATED APPLICATION(S)

The present application claims priority to and incorporates by reference the entire contents of Japanese Patent Application No. 2018-023015 filed in Japan on Feb. 13, 2018.

BACKGROUND

The present disclosure relates to a hybrid vehicle.

Japanese Laid-open Patent Publication No. 2006-240608 discloses a hybrid vehicle in which a torque output from an engine is limited so as not to exceed a torque capacity of a motor generator.

In the related art, in a hybrid vehicle, the motor generator takes charge of an inertia torque in addition to an engine reaction torque. Due to this, a motor generator torque is decreased by the amount of the inertia torque. Accordingly, a direct torque is also decreased, thereby deteriorating the acceleration response. In response to this, it is considered that, in a hybrid vehicle, when the engine speed is increased, the engine torque is obtained by summing the engine inertia torque and the engine request torque so that the summed torque is output as the engine torque, and the reaction torque, which is opposite to the engine request torque, is output from the motor generator so as to improve the acceleration response.

However, actual acceleration performance does not necessarily correspond to the driving power characteristics that a user can obtain an acceleration feeling. That is, it is still difficult for some users to set an acceleration feeling which is optimal for them.

SUMMARY

There is a need for providing a hybrid vehicle capable of allowing a user to obtain a desired acceleration feeling.

According to an embodiment, a hybrid vehicle includes an engine; a motor generator; and an electronic control unit to control the engine and the motor generator. Further, when an engine speed thereof is increased, the electronic control unit calculates an engine torque by adding an engine inertia torque to a request engine torque and cause the engine to output the calculated engine torque, and cause the motor generator to output a reaction torque in response to the request engine torque, and the electronic control unit performs control so that a torque assistance amount exerted by the motor generator is changeable while the engine speed is increased.

DETAILED DESCRIPTION

Hereinafter, an embodiment of a hybrid vehicle according to the present disclosure will be described. It should be noted that the disclosure is not limited to the embodiment.

Figure 1:
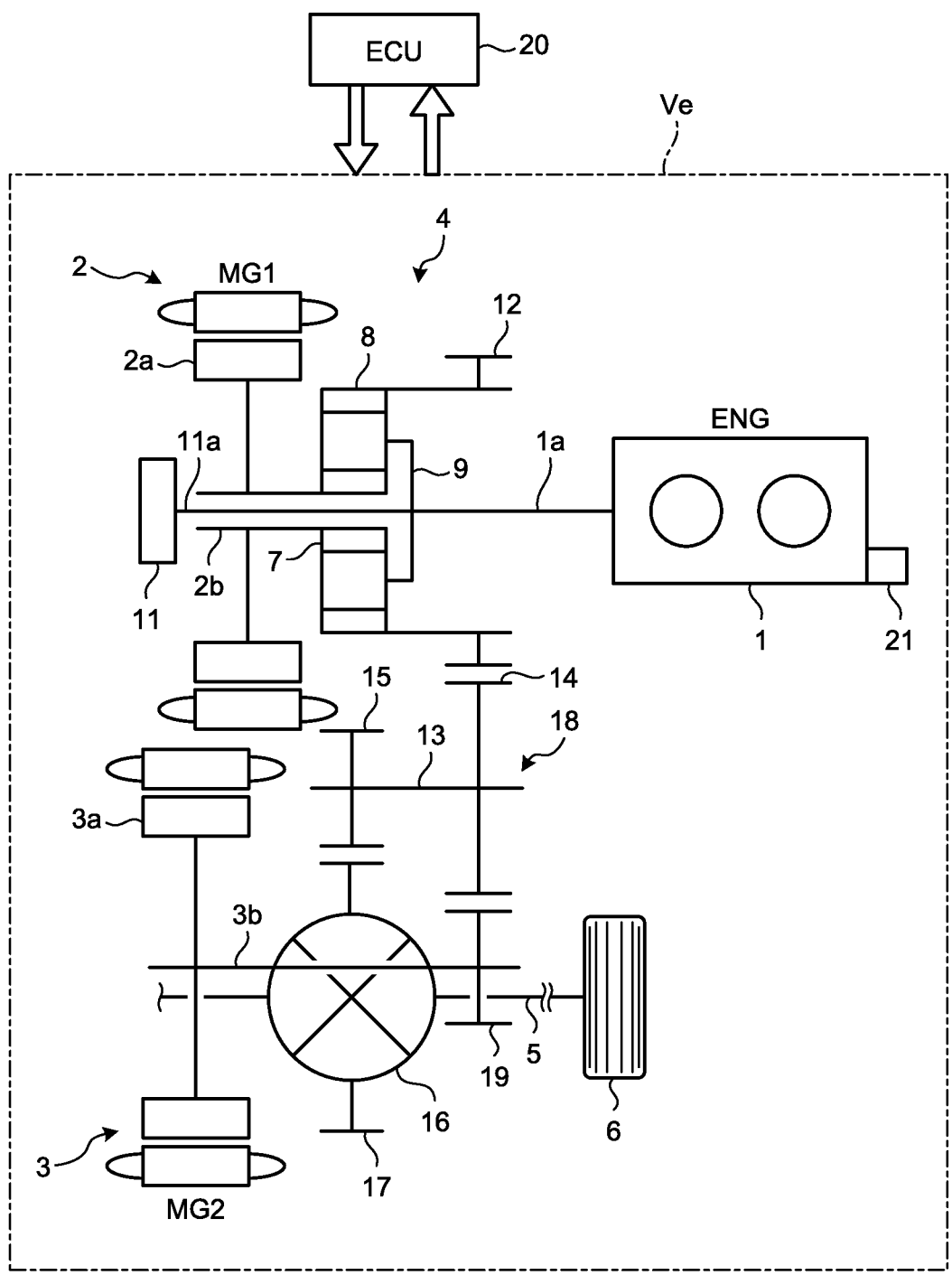
FIG. 1 is a skeleton diagram illustrating an example of a power train of a hybrid vehicle.

FIG. 1 is a skeleton diagram illustrating an example of a power train of a hybrid vehicle Ve. The hybrid vehicle Ve includes three driving power sources which are an engine (ENG) 1 as a main prime mover, a first motor generator (MG1) 2 and a second motor generator (MG2) 3. The hybrid vehicle Ve transmits the power output from the engine 1 so that the power is divided to the first motor generator 2 and a drive shaft 5 by a power dividing mechanism 4. Further, the electricity generated by the first motor generator 2 is supplied to the second motor generator 3, and the driving power output from the second motor generator 3 is added to the drive shaft 5 and a drive wheel 6.

Both the first motor generator 2 and the second motor generator 3 are electric motors, which have a function of a motor, which outputs a torque by driving electricity supplied thereto, and a function of a generator (electricity generation function) which generates electricity by a torque applied thereto. Furthermore, the first motor generator 2 and the second motor generator 3 are electrically connected to a power storage device such as a battery or a capacitor through an inverter (not illustrated) and are used to receive electricity from the power storage device or to store generated electricity in the power storage device.

The power dividing mechanism 4 is disposed on the same axis as those of the engine 1 and the first motor generator 2. An output shaft 1a of the engine 1 is connected to a carrier 9 of a planetary gear mechanism constituting the power dividing mechanism 4. The output shaft 1a serves as an input shaft of the power dividing mechanism 4 in a power transmission path extending from the engine 1 to the drive wheel 6. Further, a rotation shaft 11a of an oil pump 11, which supplies oil to lubricate and cool the power dividing mechanism 4 or to cool heat generated by copper loss and iron loss of the first motor generator 2 and the second motor generator 3, is connected to the carrier 9.

The first motor generator 2 is disposed at a position adjacent to the power dividing mechanism 4 and opposite to the engine 1 with respect to the power dividing mechanism 4, and a rotor shaft 2b, which rotates together with a rotor 2a of the first motor generator 2, is connected to a sun gear 7 of the planetary gear mechanism. The rotor shaft 2b and the rotation shaft of the sun gear 7 are formed as hollow shafts, the rotation shaft 11a of the oil pump 11 extends through the hollow portions of the rotor shaft 2b and the rotation shaft of the sun gear 7, and the rotation shaft 11a is connected to the output shaft 1a of the engine 1 through the hollow portion.

In an outer peripheral portion of a ring gear 8 of the planetary gear mechanism, a first drive gear 12, which is an external tooth gear, serving as an output member is integrally formed with the ring gear 8. Further, a counter shaft 13 is disposed in parallel to the rotation axes of the power dividing mechanism 4 and the first motor generator 2. A counter driven gear 14, which engages with the first drive gear 12, is attached to one end portion of the counter shaft 13 to rotate together. The counter driven gear 14 is used to amplify the torque transmitted from the first drive gear 12. Meanwhile, a counter drive gear 15 is attached to the other end portion of the counter shaft 13 to rotate together with the counter shaft 13. The counter drive gear 15 engages with a differential ring gear 17 of a differential gear 16. Thus, the ring gear 8 of the power dividing mechanism 4 is connected to the drive shaft 5 and the drive wheel 6 so that power can be transmitted thereto via an output gear train 18 including the first drive gear 12, the counter shaft 13, the counter driven gear 14, the counter drive gear 15, and the differential ring gear 17.

In the power train of the hybrid vehicle Ve, the torque output from the second motor generator 3 can be added to the torque transmitted from the power dividing mechanism 4 to the drive shaft 5 and the drive wheel 6. Specifically, a rotor shaft 3b, which rotates together with a rotor 3a of the second motor generator 3, is disposed in parallel to the counter shaft 13. Further, a second drive gear 19, which engages with the counter driven gear 14, is attached to a front end of the rotor shaft 3b to rotate together. Thus, the second motor generator 3 is connected to the ring gear 8 of the power dividing mechanism 4 so that power can be transmitted thereto through the differential ring gear 17 and the second drive gear 19. That is, the ring gear 8 is connected to the drive shaft 5 and the drive wheel 6 via the differential ring gear 17 along with the second motor generator 3 so that power can be transmitted thereto.

The hybrid vehicle Ve can travel in, for example, a hybrid traveling mode (HV travel), in which the vehicle travels by using the engine 1 as a main power source, or an electric traveling mode (EV travel) in which the vehicle travels by driving the first motor generator 2 and the second motor generator 3 using the electricity of the power storage device. These traveling modes are set or switched by an Electronic Control Unit (ECU) 20. The ECU 20 is electrically connected to the engine 1, the first motor generator 2, the second motor generator 3 or the like to transmit a control instruction signal. Further, the ECU 20 includes a microcomputer as a main part and executes a calculation by using input data, previously stored data, and programs and outputs the calculation result as a control instruction signal. The data input to the ECU 20 is a vehicle speed, a vehicle wheel speed, an accelerator opening degree, a State Of Charge (SOC) of the power storage device and the like. Further, the data previously stored in the ECU 20 include a map in which the traveling modes are determined, a map in which an optimal fuel efficiency operation point of the engine 1 is determined, a map in which a request power Pe_req of the engine 1 (the engine request output) is determined. The ECU 20 outputs, for example, an instruction signal at the time of starting or stopping the engine 1, a torque instruction signal of the first motor generator 2, the torque instruction signal of the second motor generator 3, a torque instruction signal of the engine 1 as the control instruction signal.

Figure 2:
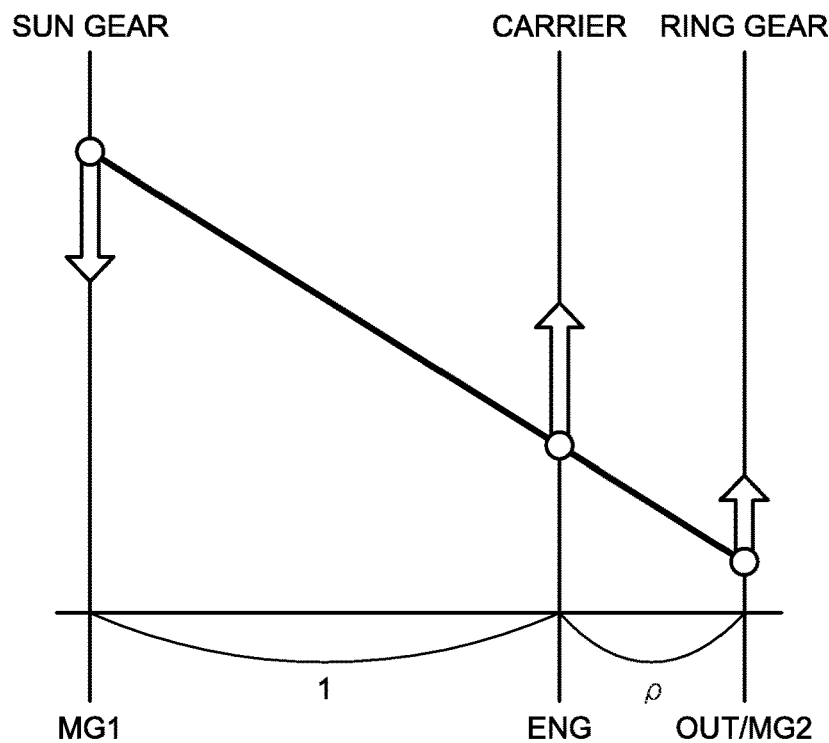
FIG. 2 is a collinear diagram of a power dividing mechanism using a single pinion type planetary gear mechanism of FIG. 1.

FIG. 2 is a collinear diagram of the power dividing mechanism 4 including the single pinion type planetary gear mechanism of FIG. 1. The collinear diagram of FIG. 2 includes a vertical line (an engine shaft) indicating the carrier 9 is disposed between a vertical line indicating the sun gear 7 (a first motor generator shaft) and a vertical line indicating the ring gear 8 (a second motor generator shaft and an output shaft). Further, when the distance between the vertical line indicating the sun gear 7 and the vertical line indicating the carrier 9 is "1", the distance between the vertical line indicating the carrier 9 and the vertical line indicating the ring gear 8 corresponds to a gear ratio $\rho$. Furthermore, the gear ratio $\rho$ indicates a ratio between the number of teeth of the sun gear 7 and the number of teeth of the ring gear 8 in the planetary gear mechanism constituting the power dividing mechanism 4. The distances in the lines of the rotation components from the base line indicate the respective rotation speed of the rotation components, and a line connecting the points illustrating the rotation speeds of the rotation components becomes a straight line. Furthermore, arrows illustrated in FIG. 2 indicate the respective magnitudes and the directions of the torques of the rotation components.

Further, the collinear diagram of FIG. 2 illustrates an operation state in the hybrid traveling mode. In the hybrid traveling mode, the vehicle travels mainly by using the power of the engine 1. That is, the engine 1 outputs a request engine torque Te_req in response to the request driving power. In this case, the first motor generator 2 functions as a generator and outputs a torque in a direction opposite to the rotation direction of the engine 1 (negative rotation direction) to function as a reaction force receiver that supports a reaction force of the request engine torque Te_req.

Further, in the power train illustrated in FIG. 1, a relationship between a maximum torque Te_max that can be output from the engine 1 and a maximum torque Tg_max that can be output from the first motor generator 2 is set in a manner that the torque acting on the carrier 9 at the time of outputting the maximum torque Te_max that can be output from the engine 1 when an engine speed (engine rotation speed) Ne is increased on the basis of the acceleration request is greater than the torque acting on the carrier 9 at the time of outputting the maximum torque Tg_max that can be output from the first motor generator 2 when the engine speed Ne is increased on the basis of the acceleration request. When the relationship between the maximum torque Te_max of the engine 1 and the maximum torque Tg_max of the first motor generator 2 is expressed by using an equation in consideration of the gear ratio $\rho$, the equation can be expressed by the following equation (1).

$$\text{Te\_max} > \{(1+\rho)/\rho\} \times \text{Tg\_max} \quad (1)$$

Furthermore, the torque for increasing the output torque of the engine 1 can be increased by using, for example, a supercharger 21. The supercharger 21 includes, for example, a mechanical supercharger which is driven by the power of the output shaft 1a of the engine 1 (supercharger) and an exhaust type supercharger which is driven by kinetic energy of an exhaust gas (turbocharger).

As described above, in the hybrid traveling mode of the hybrid vehicle Ve, the hybrid vehicle Ve travels by mainly using the engine 1 as a power source. Specifically, when the engine 1 and the power dividing mechanism 4 are connected to each other, the power output from the engine 1 can be transmitted to the drive wheel 6. In this way, when the power output from the engine 1 is transmitted to the drive wheel 6, a reaction force output from the first motor generator 2 is applied to the power dividing mechanism 4. To that end, the sun gear 7 of the power dividing mechanism 4 is functioned as a reaction force component so that the torque output from the engine 1 can be transmitted to the drive wheel 6. That is, the first motor generator 2 outputs a reaction torque for the request engine torque Te_req so that the torque, which corresponds to the request engine torque Te_req based on the acceleration request, can be applied to the drive wheel 6.

Further, the first motor generator 2 can arbitrarily control its rotation speed in response to an energized current value or a frequency thereof. Therefore, it is possible to arbitrarily control the engine speed Ne by controlling the rotation speed of the first motor generator 2. Specifically, the request driving power is obtained in response to the accelerator opening degree, the vehicle speed or the like, which is determined by a driver's accelerator pedal stepping amount. Further, on the basis of the request driving power, the request power Pe_req of the engine 1 is obtained. Further, the request engine torque Te_req, which is requested by the driver, is obtained from the request power Pe_req and the current engine speed Ne of the engine 1. Then, the operation point of the engine 1 is determined from an optimal fuel efficiency line where the fuel efficiency of the engine 1 becomes preferable. Further, the rotation speed of the first motor generator 2 is controlled so that the operation point of the engine 1 is obtained as described above. That is, the torque Tg or the rotation speed of the first motor generator 2 is controlled in response to the torque transmitted from the engine 1 to the power dividing mechanism 4. Specifically, the rotation speed of the first motor generator 2 is controlled so that the engine speed Ne is controlled at a target engine speed Ne_req. In this case, since the rotation speed of the first motor generator 2 can be continuously changed, the engine speed Ne can be also continuously changed.

As described above, the engine speed Ne is controlled by the first motor generator 2, and the torque Tg of the first motor generator 2 is controlled in response to the request engine torque Te_req. In that case, the first motor generator 2 functions as the reaction force component as described above. Further, in the control of the engine speed Ne, an inertia torque Tg_iner for increasing the engine speed Ne is obtained by, for example, the acceleration request or the like. In this case, the inertia torque Tg_iner is a positive value (Tg_iner>0). Specifically, the engine speed Ne is increased while the current actual engine speed Ne is less than the target engine speed Ne_req. Then, the inertia torque Tg_iner is taken care of by the engine 1 or one of driving power sources of the motor generators 2 and 3.

For example, when the vehicle is in a steady traveling state or a smooth acceleration is requested, the engine speed Ne is controlled by the first motor generator 2 as described above. That is, the inertia torque Tg_iner for maintaining or smoothly increasing the engine speed Ne is output from the first motor generator 2. Thus, the torque Tg output from the first motor generator 2 can be expressed by the following equation (2).

$$Tg = -\{\rho/(1+\rho)\} \times Te\_req + Tg\_iner \quad (2)$$

Furthermore, the amount "$-\{\rho/(1+\rho)\} \times T\_req$" of the above-described equation (2) indicates the above-described reaction torque. Further, since a relationship between the torques of the rotation components of the planetary gear mechanism constituting the power dividing mechanism 4 is determined on the basis of the gear ratio ρ (i.e., a ratio between the number of teeth of the sun gear 7 and the number of teeth of the ring gear 8), it is possible to obtain the torque Tg output from the first motor generator 2 by using the above-described equation (2).

On the other hand, when the amount of the acceleration request is relatively great due to a sudden acceleration or the like as described above, the inertia torque Tg_iner necessary for increasing the engine speed Ne is increased. For this reason, when the engine speed Ne is controlled by the first motor generator 2 as described above, there may be a concern that the request engine torque Te_req cannot be output from the drive wheel 6 and the driver cannot obtain a desired acceleration feeling. Therefore, in this embodiment, when the amount of the acceleration request is great due to a sudden acceleration or the like, in addition to the request engine torque Te_req, the inertia torque Te_iner for increasing the engine speed Ne is output from the engine 1 as well. Furthermore, the inertia torque Te_iner refers to an inertia torque converted into the axial torque of the engine 1 and can be converted by using the following equation (3) based on a relationship with the gear ratio ρ of the planetary gear mechanism constituting the power dividing mechanism 4.

$$Te\_iner = \{(1+\rho)/\rho\} \times Tg\_iner \quad (3)$$

Thus, in the description below, the inertia torque is denoted by "inertia torque Te_iner" when the inertia torque is output from the engine 1 and "inertia torque Tg_iner" when the inertia torque is output from the first motor generator 2.

Further, in the power train of FIG. 1, a relationship between the maximum torque Te_max that can be output from the engine 1 and the maximum torque Tg_max that can be output from the first motor generator 2 is set in a manner that the torque acting on the carrier 9 at the time of outputting the maximum torque Te_max that can be output from the engine 1 when the engine speed Ne is increased on the basis of the acceleration request is greater than the torque acting on the carrier 9 at the time of outputting the maximum torque Tg_max that can be output from the first motor generator 2 when the engine speed Ne is increased on the basis of the acceleration request. That is, in this embodiment, when the amount of the acceleration request is great due to a sudden acceleration or the like as described above, the request engine torque Te_req and the inertia torque Te_iner are output from the engine 1. For this reason, the maximum torque Te_max of the engine 1 is set so that at least a torque, which is obtained by considering the inertia torque Te_iner in the maximum torque Tg_max that can be output from the first motor generator 2, can be output.

When the relationship between the maximum torque Te_max of the engine 1 and the maximum torque Tg_max of the first motor generator 2 is expressed by using an equation in consideration of the gear ratio, the equation can be expressed by the following equation (4).

$$Te\_max > \{(1+\rho)/\rho\} \times Tg\_max \quad (4)$$

Furthermore, the torque for increasing the output torque of the engine 1 is increased by, for example, the supercharger 21. The supercharger 21 includes a mechanical supercharger which is driven by the power of the output shaft 1a of the engine 1(supercharger), and an exhaust type supercharger which is driven by kinetic energy of an exhaust gas (turbocharger).

Next, an example control executed by the ECU 20 in order to calculate the engine torque Te_cmd actually given in instruction to the engine 1 will be described.

First, the ECU 20 obtains the request power Pe_req of the engine 1. The request power Pe_req of the engine 1 is obtained from the request driving power obtained from the accelerator opening degree or the vehicle speed determined on the basis of the driver's accelerator pedal stepping amount and is determined by referring to, for example, a previously prepared map.

Next, the ECU 20 obtains the request engine torque Te_req. The request engine torque Te_req refers to, for example, an engine torque requested by the driver and is a value obtained on the basis of the driver's accelerator pedal operation amount or the like. Thus, the request engine torque can be obtained from the request driving power and the current engine speed Ne.

Next, the ECU 20 calculates the inertia torque Tg_iner. As described above, the inertia torque Tg_iner refers to a torque necessary when the engine speed Ne is increased on the basis of the acceleration request. Specifically, the inertia torque is a torque for changing the rotation speeds of the engine 1 and the first motor generator 2. The inertia torque Tg_iner can be calculated by feedback control and feedforward control. In the feedback control, the inertia torque is obtained on the basis of a deviation between the actual engine speed Ne in a current routine and the target engine speed Ne_req in the current routine. Further, in the feedforward control, the inertia torque Tg_iner is obtained on the basis of a deviation between the target engine speed Ne_req of the current routine and the target engine speed Ne_req+1 of the routine after the current routine. That is, the inertia torque Tg_iner can be obtained by the feedback torque Tg_fb of the feedback control and the feedforward torque Tg_ff of the feedforward control. Therefore, the inertia torque Tg_iner can be expressed by using the following equation (5).

$$Tg\_iner=Tg\_fb+Tg\_ff \quad (5)$$

Furthermore, the feedforward torque Tg_ff can be obtained by multiplying the target engine speed increase amount dNe to be increased during one routine by the inertia moment Ie of the engine 1 and the first motor generator 2 and further multiplying the above result by a converting coefficient K for converting the axial torque of the engine 1 into the axial torque of the first motor generator 2. This can be simply expressed by using the following equation (6).

$$Tg\_ff=Ie \times K \times dNe/dt \quad (6)$$

Furthermore, in the above-described equation (5), an influence on a change in rotation of the rotation shaft of the second motor generator 3 is not considered since the influence is relatively small.

Next, it is determined whether the calculated inertia torque Tg_iner is greater than a predetermined threshold value α. As described above, this determination is made to determine whether the inertia torque Tg_iner during the control of the engine speed Ne by the first motor generator 2 is larger than the threshold value α. In other words, it is determined whether an acceleration request is relatively large due to a sudden acceleration or the like. Thus, the threshold value α is set to, for example, a value of the inertia torque which is necessary to increase a change rate of the engine speed Ne. Note that the threshold value α is not only applied to a case in which the acceleration request is relatively great due to a sudden acceleration or the like but also applied to a case in which the engine rotation speed-engine speed Ne is increased when there is at least the acceleration request regardless of the degree of the acceleration request. Thus, the threshold value α is appropriately set in response to the degree of the acceleration request, the type of vehicle or the like, and the value of the threshold value α is set to at least 0 or more.

When the value of the inertia torque Tg_iner is greater than the threshold value α due to, for example, a large change rate of the engine speed Ne, as the engine torque Te_cmd actually given in instruction to the engine 1, a total torque is given, which is obtained by adding the inertia torque Te_iner converted into the engine shaft to the request engine torque Te_req. Thus, the engine torque Te_cmd, which is actually given in instruction to the engine 1, can be simplified as expressed by using the following equation (7).

$$Te\_cmd=Te\_req+Te\_iner \quad (7)$$

Meanwhile, when the value of the inertia torque Tg_iner is equal to or less than the threshold value α, the request engine torque Te_req is given in instruction as the engine torque Te_cmd which is actually given in instruction to the engine 1. Thus, the engine torque Te_cmd which is actually given in instruction to the engine 1 can be expressed by using the following equation (8).

$$Te\_cmd=Te\_req \quad (8)$$

The above-described control is repeated, for example, every predetermined time, and the one routine corresponds to the "predetermined time".

Here, there is a tendency that good acceleration performance is obtained if the engine speed increasing assistance is executed to a relatively high engine speed by the first motor generator 2 since acceleration time to a target vehicle speed can be shortened. However, in this case, the user may feel an acceleration feeling in a manner that the engine speed is largely increased to obtain maximum driving power, and then, the driving power is maintained or gradually decreased in accordance with the vehicle speed. On the other hand, when the engine 1 is equipped with the supercharger 21, the user may expect a high torque from the low rotation of the engine 1 and acceleration characteristics (i.e., continuous acceleration) that the driving power increases as the engine speed increases. As a result, the user's expectation cannot be fulfilled because the driving power is obtained after the engine rotation of the engine 1 becomes high and the acceleration characteristic is poor after the driving power is output.

For that reason, in the hybrid vehicle Ve according to this embodiment, there are provided two traveling modes: a first traveling mode which more attention is focused on the acceleration performance by starting acceleration from the high rotation of the engine 1 and a second traveling mode in which more attention is focused on a user's acceleration feeling by starting an acceleration from the low rotation of the engine 1, the selection being done based on the user's operation on a mode switching operation unit 40.

Note that the mode switching between the first traveling mode and the second traveling mode cannot be done during at a mode switching prohibiting timing which is set as a period from the start to the end of the engine speed increasing assistance of the first motor generator 2. As a mode switching allowing timing in which a switching the first traveling mode and the second traveling mode can be set, there are, for example, a period in which the hybrid vehicle Ve stops or travels at a constant speed, a smooth acceleration period in which the engine speed increasing assistance control by the first motor generator 2 is not executed, and an acceleration period by the first motor generator 2 after the end of the engine speed increasing assistance.

Figure 3:
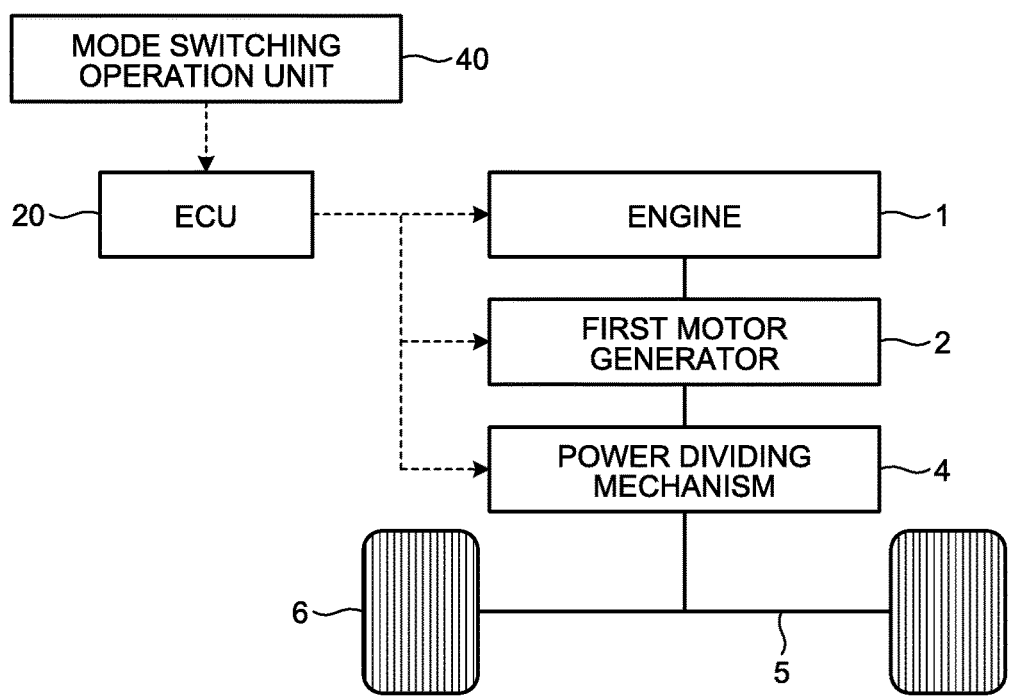
FIG. 3 is a diagram illustrating an example of a mode switching system of a hybrid vehicle Ve according to an embodiment.

FIG. 3 is a diagram illustrating an example of a mode switching system of the hybrid vehicle Ve according to the embodiment.

When a user operates the mode switching operation unit 40 to switch from the first traveling mode to the second traveling mode or switch from the second traveling mode to the first traveling mode, a mode switching signal is transmitted from the mode switching operation unit 40 to the ECU 20. Then, the ECU 20 controls the engine 1, the first motor generator 2, the power dividing mechanism 4 or the like on the basis of the signal transmitted from the mode switching operation unit 40, so that the traveling mode is switched from the first traveling mode to the second traveling mode or from the second traveling mode to the first traveling mode. However, in a case where the user switches the mode at the mode switching prohibiting timing, even if the ECU 20 receives the signal from the mode switching operation unit 40, the ECU 20 temporarily does not switch the mode, and switches after the timing is changed into the mode switching allowing timing.

Figure 4:
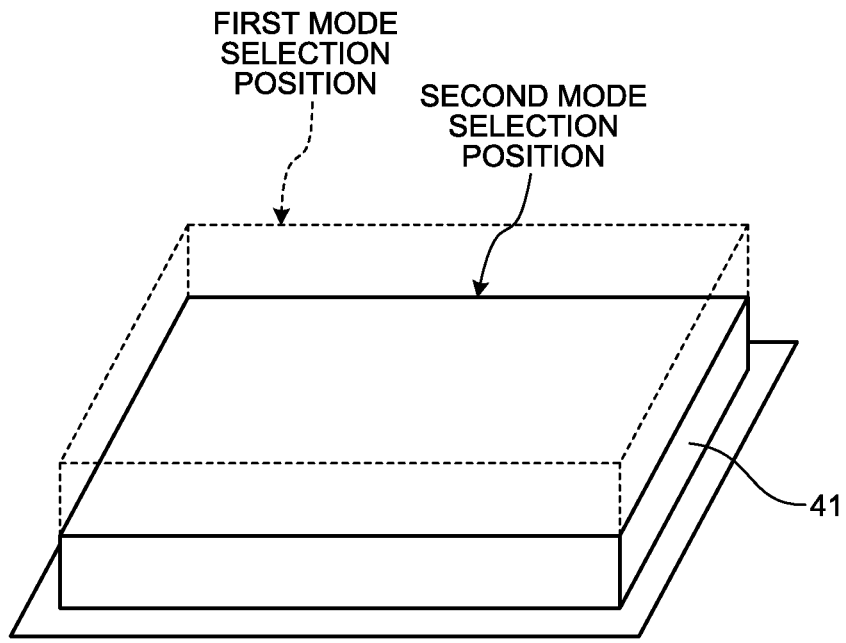
FIG. 4 is a diagram illustrating a push button as an example of a mode switching operation unit to switch a mode.

FIG. 4 is a diagram illustrating a case in which a mode is switched by using a push button 41 which is one example of the mode switching operation unit 40. In FIG. 4, whenever the user pushes the push button 41, the modes are alternately switched between a first traveling mode selection position, which is indicated by a dashed line in FIG. 4 and in which the push button 41 protrudes the most, and a second traveling mode selection position, which is indicated by a solid line in FIG. 4 and in which the push button 41 is pushed the most.

Accordingly, the user can switch the traveling mode to the second traveling mode by pushing the push button 41 located at the first traveling mode selection position so that the push button 41 is located at the second traveling mode selection position. Further, the user can switch the traveling mode to the first traveling mode by pushing the push button 41 located at the second traveling mode selection position so that the push button 41 is located at the first traveling mode selection position.

Figure 5:
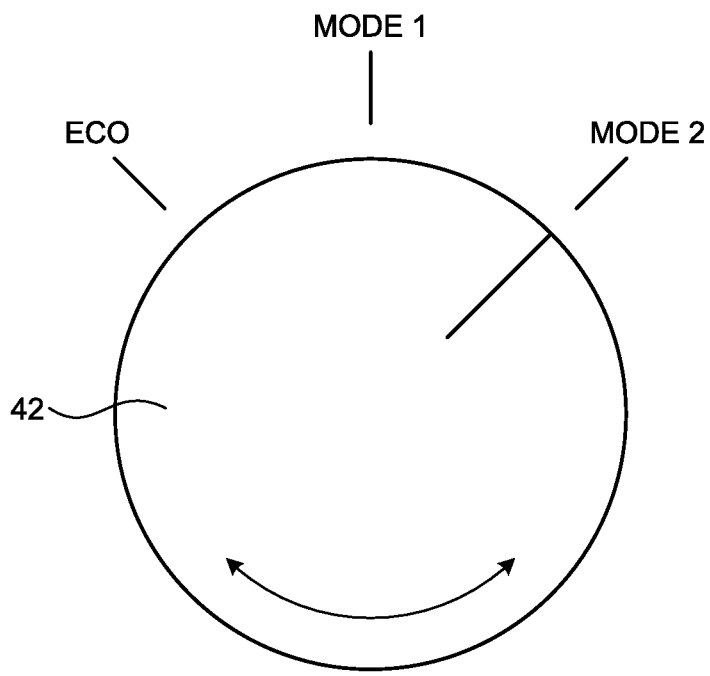
FIG. 5 is a diagram illustrating a dial as an example of the mode switching operation unit to switch the mode.

FIG. 5 is a diagram illustrating a case in which a mode is switched by using a dial 42 which is another example of the mode switching operation unit 40. In FIG. 5, as a dial scale, "MODE1" corresponding to the first traveling mode, "MODE2" corresponding to the second traveling mode, and "ECO" corresponding to the eco mode focusing on the fuel efficiency performance are to be set. Then, the user can switch the traveling mode to the first traveling mode by rotating the dial 42 to select "MODE1". Further, the user can switch the traveling mode to the second traveling mode by rotating the dial 42 to select "MODE2". Further, the user can switch the traveling mode to the eco mode by rotating the dial 42 to select "ECO".

Figure 6:
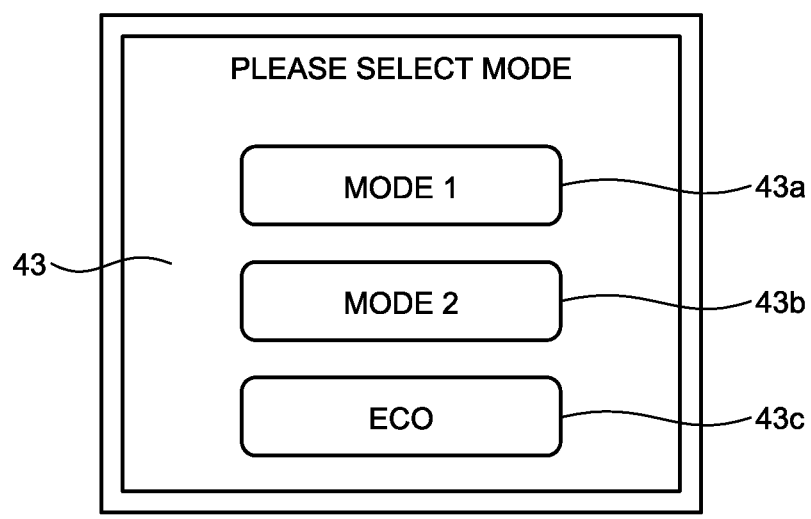
FIG. 6 is a diagram illustrating a touch panel type display as an example of the mode switching operation unit to switch the mode.

FIG. 6 is a diagram illustrating a case in which a mode is switched by a touch panel type display 43 which is another example of the mode switching operation unit 40. In FIG. 6, the user can switch the traveling mode to the first traveling mode by pushing a software key 43a of "MODE1" corresponding to the first traveling mode displayed on the display 43. Further, the user can switch the traveling mode to the second traveling mode by pushing a software key 43b of "MODE2" corresponding to the second traveling mode displayed on the display 43. Further, the user can switch the traveling mode to the eco mode by pushing a software key 43c of "ECO" corresponding to the eco mode displayed on the display 43.

Figure 7:
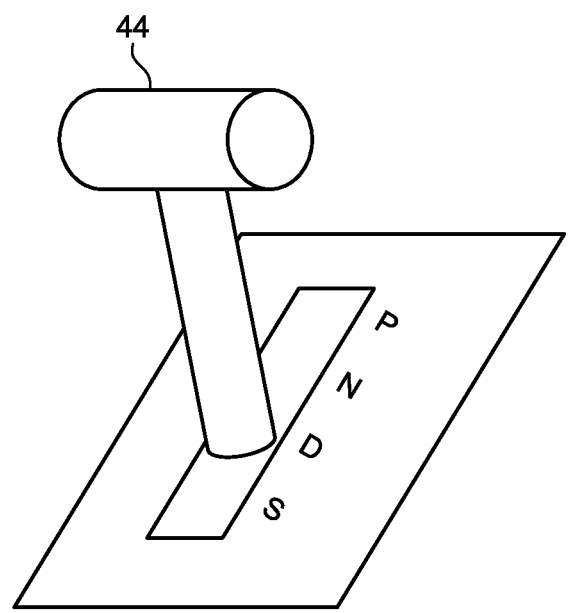
FIG. 7 is a diagram illustrating a shift lever as an example of the mode switching operation unit to switch the mode.

FIG. 7 is a diagram illustrating a case in which a mode is switched by a shift lever 44 which is another example of the mode switching operation unit 40. In FIG. 7, the traveling mode becomes the first traveling mode when a shift range is a D (drive) range. Further, the traveling mode becomes the second traveling mode when the shift range is an S (sports) range. Furthermore, here, a case is assumed that the user selects the S range so that the S range is set to the second traveling mode when selecting the sports traveling mode to obtain an acceleration feeling compared to the D range.

Then, the user can switch the traveling mode from the first traveling mode to the second traveling mode by operating the shift lever 44 to switch the shift range from the D range to the S range. In contrast, the user can switch the traveling mode from the second traveling mode to the first traveling mode by operating the shift lever 44 to switch the shift range from the S range to the D range.

Figure 8:
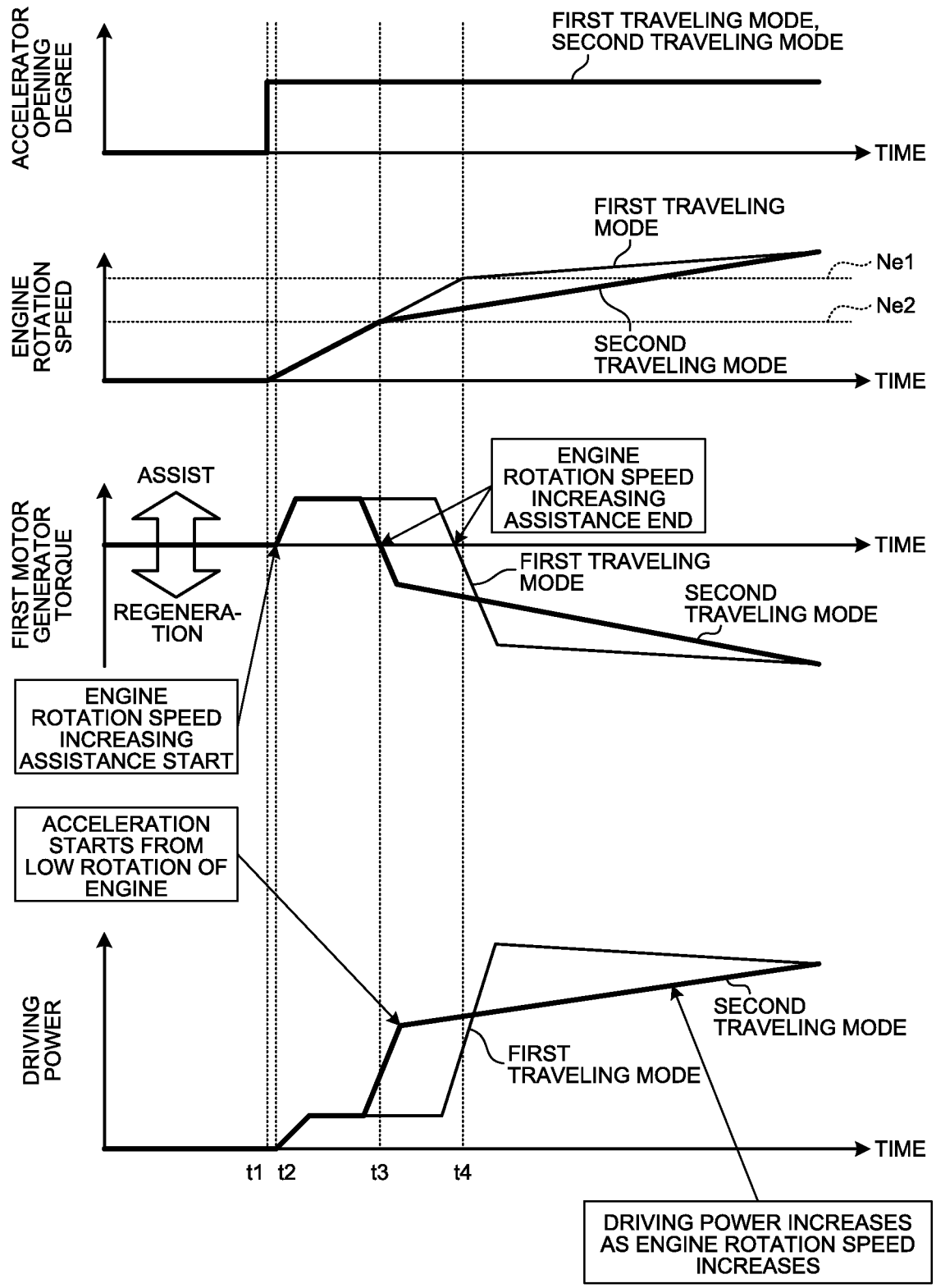
FIG. 8 is a timing chart illustrating an example of an accelerator opening degree, an engine speed, a first motor generator torque, and a driving power.
Figure 9:
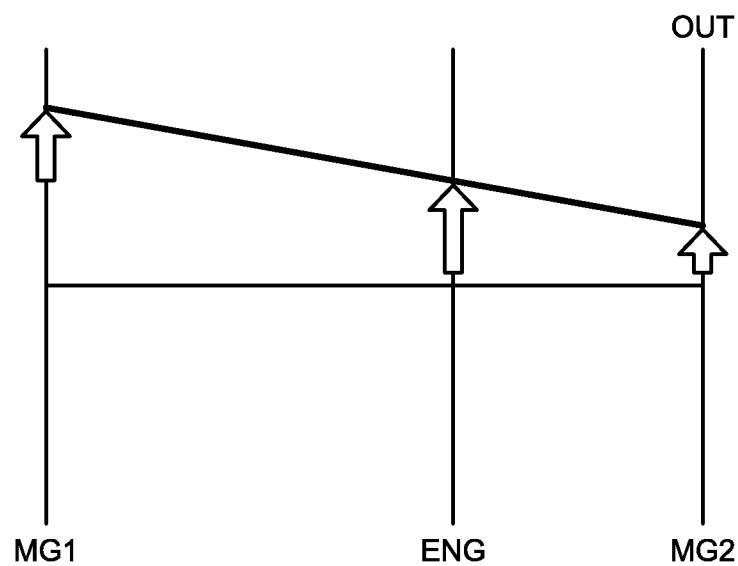
FIG. 9 is a collinear diagram during an engine speed assistance executed by a first motor generator.
Figure 10:
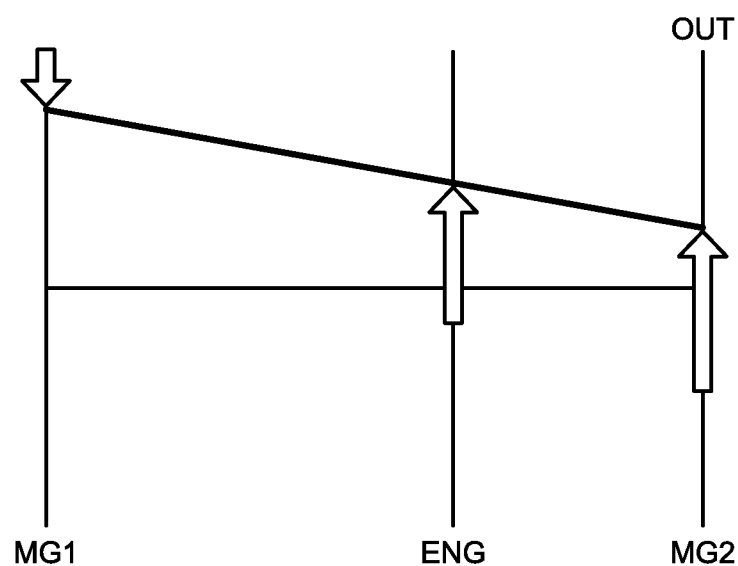
FIG. 10 is a collinear diagram after the engine speed assistance executed by the first motor generator ends.

FIG. 8 is a timing chart illustrating example timings of the accelerator opening degree, the engine speed, the first motor generator torque, and the driving power in the first traveling mode and the second traveling mode. FIG. 9 is a collinear diagram during the engine speed assistance exerted by the first motor generator 2. FIG. 10 is a collinear diagram after the end of the engine speed assistance by the first motor generator 2. Furthermore, the arrows illustrated in FIGS. 9 and 10 indicate the respective magnitudes and the directions of the torques output from the rotation components.

As illustrated in FIG. 8, when there is a relatively greater acceleration request by a sudden increase of the accelerator opening degree at the time t1 in a case where the traveling mode is the first traveling mode, the engine speed increasing assistance by the first motor generator 2 starts at the time t2. In this case, the first motor generator 2 outputs a torque in a positive direction which is the same as that of the torque output from the engine 1 as illustrated in FIG. 9 during the timing from the start to the end of the engine speed increasing assistance by the first motor generator 2. Then, when the engine speed Ne reaches the raised target engine speed Ne1 in the first traveling mode at the time t4, the engine speed increasing assistance by the first motor generator 2 ends. After the end of the engine speed increasing assistance by the first motor generator 2, the first motor generator 2 outputs a torque in a negative direction which is opposite to that of the torque output from the engine 1 as illustrated in FIG. 10. Accordingly, the first motor generator 2 generates a reaction torque to generate electricity, and transmits a direct torque to the drive shaft 5.

When there is a relatively greater acceleration request by a sudden increase of the accelerator opening degree at the time t1 in a case where the traveling mode is the second traveling mode, the engine speed increasing assistance by the first motor generator 2 starts at the time t2. In this case, the first motor generator 2 outputs a torque in a positive direction which is the same as that of the torque output from the engine 1 as illustrated in FIG. 9 from the start to the end of the engine speed increasing assistance exerted by the first motor generator 2.

Here, as illustrated in FIG. 8, the raised target engine speed Ne2 in the second traveling mode is set to be less than the raised target engine speed Ne1 in the first traveling mode. For that reason, in the second traveling mode, the engine speed Ne reaches the raised target engine speed Ne2 in the second traveling mode at the time t3 which is earlier than the time t4 and the engine speed increasing assistance by the first motor generator 2 ends. Then, after the engine speed increasing assistance by the first motor generator 2 ends, the first motor generator 2 outputs a torque in a negative direction which is opposite to that of the torque output from the engine 1 as illustrated in FIG. 10. Accordingly, the first motor generator 2 generates a reaction torque to generate electricity, and transmits a direct torque to the drive shaft 5. Thus, in the second traveling mode, an acceleration is started from the low rotation of the engine 1 as compared with the first traveling mode and the driving power is increased as an increase of engine speed Ne.

As described above, when the hybrid vehicle Ve according to the embodiment travels in the second traveling mode, it is possible for the user to realize a torque from a low rotation and an acceleration characteristics at a high rotation, and thus to meet the expectation for an acceleration feeling with the engine 1 including the supercharger 21.

Furthermore, in the second traveling mode, it is preferable that the engine output increase speed on and after reaching the raised target engine speed Ne2 in the second traveling mode is preferably be set to a predetermined value or more. Here, the predetermined value denotes a value necessary for increasing the driving power during an acceleration on and after reaching the raised target engine speed Ne2 in the second traveling mode. Then, in order to set the engine output increase speed to the predetermined value or more, it is possible to shift the operation point of the engine 1 so as to satisfy a relationship in the following equation (9).

$$\text{"Engine output change rate per unit time/Vehicle speed change rate per unit time"} > 1 \qquad (9)$$

As described above, in the hybrid vehicle Ve according to an embodiment of the present disclosure, the time period in which the engine speed increasing assistance is exerted by the first motor generator 2 in the second traveling mode is shorter than that in the first traveling mode. That is, in the hybrid vehicle Ve according to the embodiment, a time period in which the engine speed increasing assistance is executed by the first motor generator 2 is changeable. In other words, the torque assistance amount of the first motor generator 2 is changeable. Accordingly, in the hybrid vehicle Ve according to the embodiment, since the user operates the mode switching operation unit 40 to select the first traveling mode, which focuses on the acceleration performance and the second traveling mode, which focuses on the user's acceleration feeling, the vehicle can travel in the traveling mode which is desired by the user.

According to an embodiment, since the engine can be accelerated from a low rotation, it is possible to select a traveling mode desired by the user.

According to an embodiment, since it is possible to realize a torque from a low rotation and a continuous acceleration at a high rotation, it is possible to meet user's expectation for an engine equipped with a supercharger.

Since the hybrid vehicle according to the present disclosure may change a driving power increasing timing with respect to the engine speed by allowing a torque assistance amount of the motor generator to be changeable while the engine speed increases, there is an effect that the user can obtain a desired acceleration feeling.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hybrid vehicle comprising:
an engine;
a motor generator; and
an electronic control unit configure to control the engine and the motor generator,
wherein, when an engine speed thereof is increased, the electronic control unit calculates an engine torque by adding an engine inertia torque to a request engine torque and cause the engine to output the calculated engine torque, and cause the motor generator to output a reaction torque in response to the request engine torque, and the electronic control unit performs control so that a torque assistance amount exerted by the motor generator is changeable while the engine speed is increased, wherein the electronic control performs control so that the motor generator outputs a torque in a positive direction which is a same as that of a torque output from the engine in a period from when an engine speed increasing assistance starts to when the engine speed increasing assistance ends by the motor generator while the engine speed increases, and after the engine speed increasing assistance by the motor generator ends, the motor generator outputs a torque in a negative direction which is opposite to that of the torque output from the engine.

2. The hybrid vehicle according to claim 1, further comprising: a traveling mode switching unit configured to switch between a first traveling mode and a second traveling mode, wherein in the first traveling mode, the motor generator performs an engine speed increasing assistance to a predetermined engine speed, and in the second traveling mode, the motor generator performs the engine speed increasing assistance to an engine speed which is less than the predetermined engine speed.

3. The hybrid vehicle according to claim 1, wherein the engine is equipped with a supercharger.

* * * * *